(12) United States Patent
Gautreaux et al.

(10) Patent No.: US 12,129,076 B2
(45) Date of Patent: Oct. 29, 2024

(54) FLASK WITH ATTACHED TUMBLERS

(71) Applicant: HIGH CAMP DESIGNS, LLC, San Rafael, CA (US)

(72) Inventors: Whitney Gautreaux, San Rafael, CA (US); Nicholas Barisone, San Rafael, CA (US)

(73) Assignee: High Camp Designs, Inc., San Rafael, CA (US)

( * ) Notice: Subject to any disclaimer, the term of this patent is extended or adjusted under 35 U.S.C. 154(b) by 0 days.

(21) Appl. No.: 18/054,719

(22) Filed: Nov. 11, 2022

(65) Prior Publication Data

US 2023/0075181 A1    Mar. 9, 2023

Related U.S. Application Data

(63) Continuation of application No. 16/940,112, filed on Jul. 27, 2020, now Pat. No. 11,542,064, which is a continuation of application No. 16/160,815, filed on Oct. 15, 2018, now Pat. No. 10,723,513.

(51) Int. Cl.
| | |
|---|---|
| *B65D 23/12* | (2006.01) |
| *B65D 1/02* | (2006.01) |
| *B65D 23/02* | (2006.01) |
| *B65D 41/04* | (2006.01) |
| *B65D 81/38* | (2006.01) |

(52) U.S. Cl.
CPC ........... *B65D 23/12* (2013.01); *B65D 1/0246* (2013.01); *B65D 23/02* (2013.01); *B65D 41/0414* (2013.01); *B65D 81/3841* (2013.01)

(58) Field of Classification Search
CPC ........ B65D 51/18; B65D 23/12; B65D 23/02; B65D 23/00; B65D 39/00; B65D 81/3841; B65D 81/3837; B65D 1/0246; B65D 1/023; B65D 1/0215; B65D 1/0207; B65D 41/0414; B65D 41/0407; B65D 41/04; B65D 41/0435; B65D 2313/04; B65D 2543/00564; B65D 2251/0003; B65D 2251/0075; B65D 2251/0015
USPC ..... 215/12.2, 12.1, 387, 386, 364, 355, 356; 220/254.1, 256.1, 230, 795, 789, 304, 220/288, 504, 503, 703, 62.18; 206/541, 206/233, 217, 216; D9/716
See application file for complete search history.

(56) References Cited

U.S. PATENT DOCUMENTS

| | | | |
|---|---|---|---|
| 2018/0194518 A1* | 7/2018 | Li | B65D 23/12 |
| 2019/0069699 A1* | 3/2019 | Nichols | A47G 19/2288 |
| 2019/0389644 A1* | 12/2019 | Tolman | A47J 41/0027 |

* cited by examiner

*Primary Examiner* — Robert J Hicks
(74) *Attorney, Agent, or Firm* — MORRIS O'BRYANT COMPAGNI CANNON, PLLC

(57) ABSTRACT

A transportable flask. The transportable flask includes a bottle, where the bottle is configured to hold a liquid beverage. The transportable flask also includes a cap, where the cap is configured to attach to the bottle and prevent removal of the liquid beverage when in position. The transportable flask further includes a first cup, where the first cup is releasably attached to the bottle and a second cup, where the second cup is releasably attached to the cap.

36 Claims, 8 Drawing Sheets

FLASK WITH ATTACHED TUMBLERS

CROSS-REFERENCE TO RELATED APPLICATIONS

This application is a continuation of U.S. patent application Ser. No. 16/940,112, filed Jul. 27, 2020, which is a continuation of U.S. patent application Ser. No. 16/160,815, filed on Oct. 15, 2018, the entirety of each of which is incorporated by this reference.

BACKGROUND OF THE INVENTION

Flasks are a known device for carrying a beverage, and are often used for carrying alcoholic spirits. They may be insulated or be as simple as a sealable container that allows a user to carry the beverage as desired. They typically have opaque walls to hide the type of liquid being carried. However, flasks share a number of drawbacks.

In particular, flasks generally do not include a tumbler. Instead a user drinks straight from the flask. Thus, if a user wants to drink from the flask, he/she does so directly from the bottle. In there is a desire to share the beverage stored in the flask, then it is generally done in a non-sanitary way. Those flasks which do include a tumbler include only a single tumbler resulting in the same issues of sharing a drinking implement.

Moreover, these tumblers are attached in ways that are not easily accessed. For example, they may be threaded or otherwise attached. In addition, they are often attached directly over the cap of the flask, meaning that for even a small drink the user must unscrew the tumbler, remove the cap, pour the beverage from the bottle into the cup, reattach the cap, the screw the tumbler back onto the flask. In addition, the threading is in the location where the user places his/her lips which can lead to injury such as cuts on the user's lips.

Accordingly, there is a need in the art for a flask with more than one tumbler. In addition, there is a need in the art for an attachment method for the tumbler which is easier for a user than threading.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a transportable flask. The transportable flask includes a bottle, where the bottle is configured to hold a liquid beverage. The transportable flask also includes a cap, where the cap is configured to attach to the bottle and prevent removal of the liquid beverage when in position. The transportable flask further includes a first cup, where the first cup is releasably attached to the bottle and a second cup, where the second cup is releasably attached to the cap.

Another example embodiment includes a transportable flask. The transportable flask includes a bottle, where the bottle is configured to hold a liquid beverage. The bottle includes a neck, where the neck includes threading, a double wall and a first magnet in the double wall, where the first magnet is in the portion of the bottle opposite the neck. The transportable flask also includes a cap. The cap is configured to attach to the bottle and prevent removal of the liquid beverage when in position. The cap includes threading, where the threading is configured to mate with the threading in the bottle and a second magnet, where the second magnet is in the portion of the cap opposite the threading. The transportable flask further includes a first cup, where the first cup is releasably attached to the bottle. The first cup includes a double wall and a third magnet in the double wall on the bottom of the cup. The transportable flask additionally includes a second cup, where the second cup is releasably attached to the cap. The second cup includes a double wall and a fourth magnet in the double wall on the bottom of the cup.

Another example embodiment includes a transportable flask. The transportable flask includes a bottle, where the bottle is waterproof and is configured to hold a liquid beverage. The bottle includes a neck, where the neck includes threading. The bottle also includes a double wall, an inner coating, where the inner coating includes electropolished stainless steel, and a first magnet in the double wall, where the first magnet is in the portion of the bottle opposite the neck. The transportable flask also includes a cap. The cap is configured to attach to the bottle and prevent removal of the liquid beverage when in position. The cap includes threading, where the threading is configured to mate with the threading in the bottle and a second magnet, where the second magnet is in the portion of the cap opposite the threading. The transportable flask moreover includes a seal between the cap and the bottle. The transportable flask further includes a first cup, where the first cup is releasably attached to the bottle. The first cup includes a double wall, an inner coating, where the inner coating includes electropolished stainless steel, and a third magnet in the double wall on the bottom of the cup. The transportable flask additionally includes a second cup, where the second cup is releasably attached to the cap. The second cup includes a double wall, an inner coating, where the inner coating includes electropolished stainless steel, and a fourth magnet in the double wall on the bottom of the cup.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figures 1A, 1B:
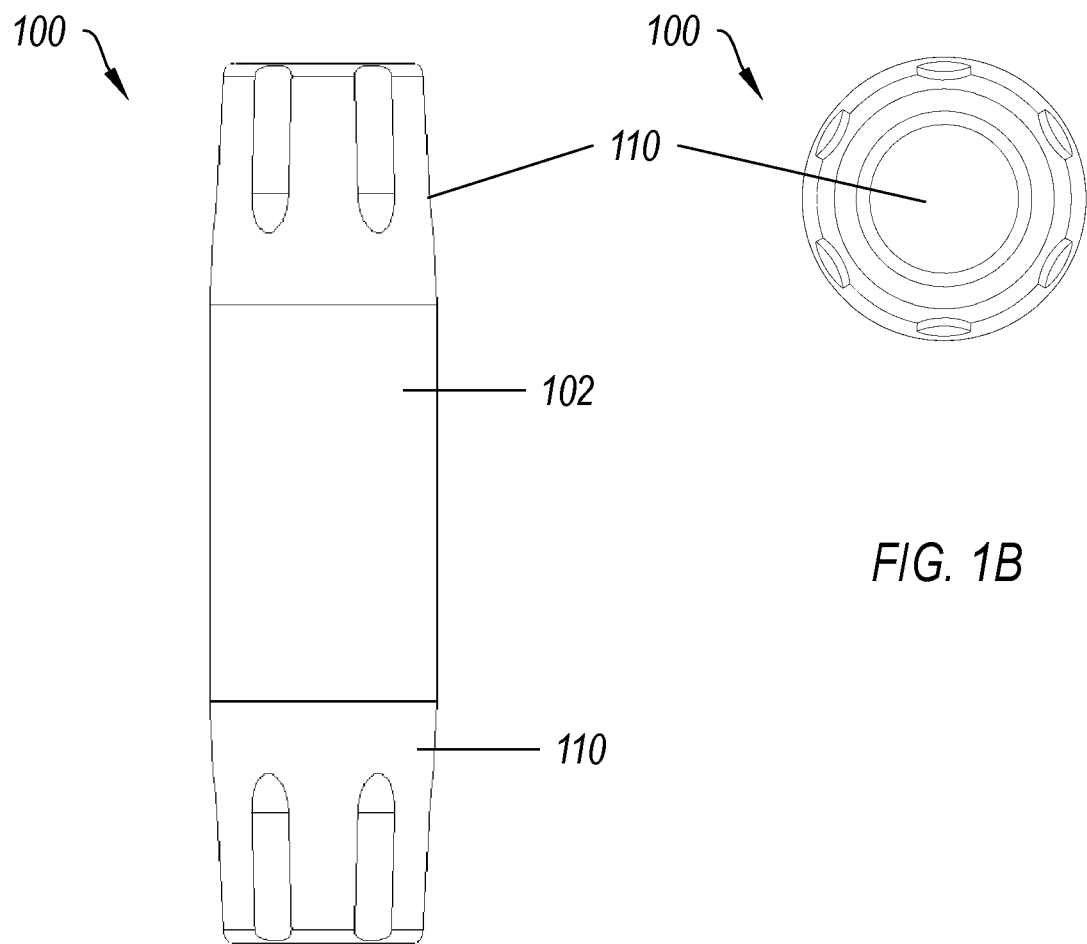
FIG. 1A illustrates a side view of the example of a transportable flask with attached tumblers.
FIG. 1B illustrates a top view of the example of a transportable flask with attached tumblers, with the bottom view being a mirror image thereof.
Figures 1C, 1D:
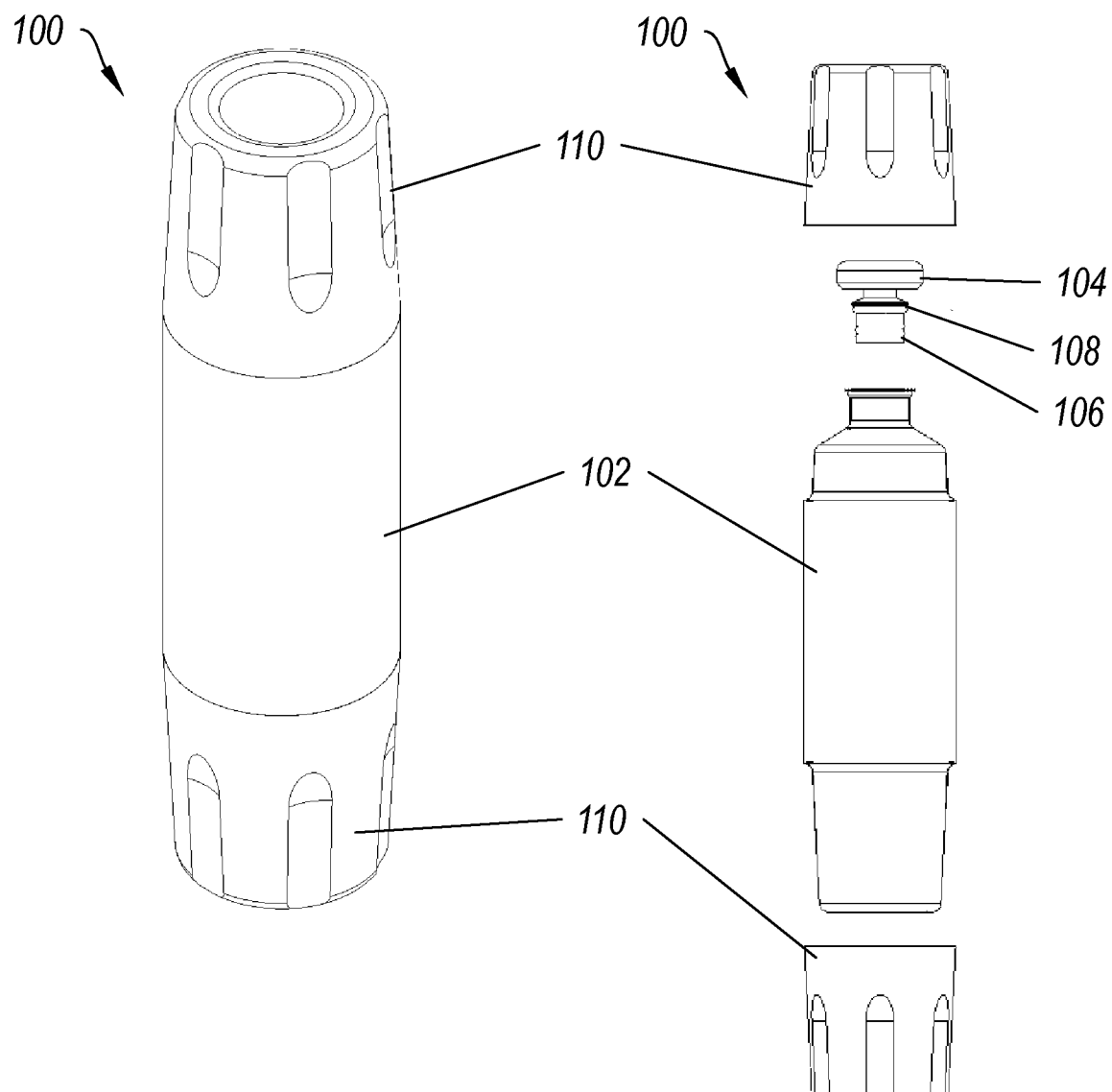
FIG. 1C illustrates an isometric view of the example of a transportable flask with attached tumblers.
FIG. 1D illustrates an expanded side view of the example of a transportable flask with attached tumblers.
Figures 1E, 1F:
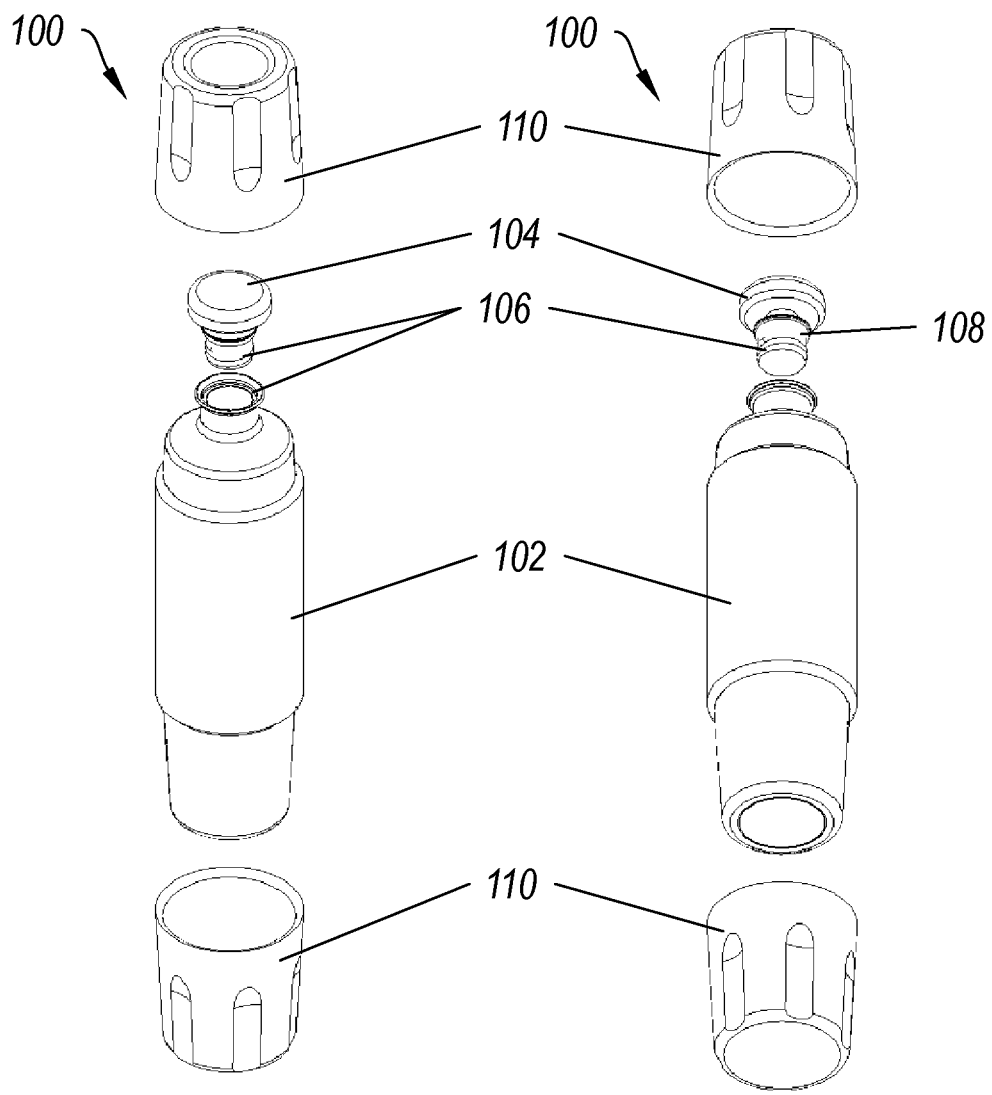
FIG. 1E illustrates an expanded top isometric view of the example of a transportable flask with attached tumblers.
FIG. 1F illustrates an expanded bottom isometric view of the example of a transportable flask with attached tumblers.
Figures 1G, 1H:
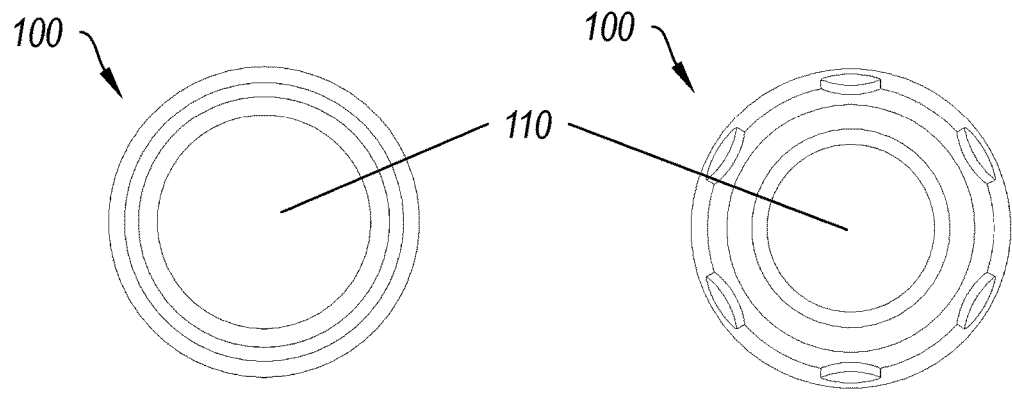
FIG. 1G illustrates a top view of the example of a tumbler from a transportable flask with attached tumblers.
FIG. 1H illustrates a bottom view of the example of a tumbler from a transportable flask with attached tumblers.
Figures 1I, 1J:
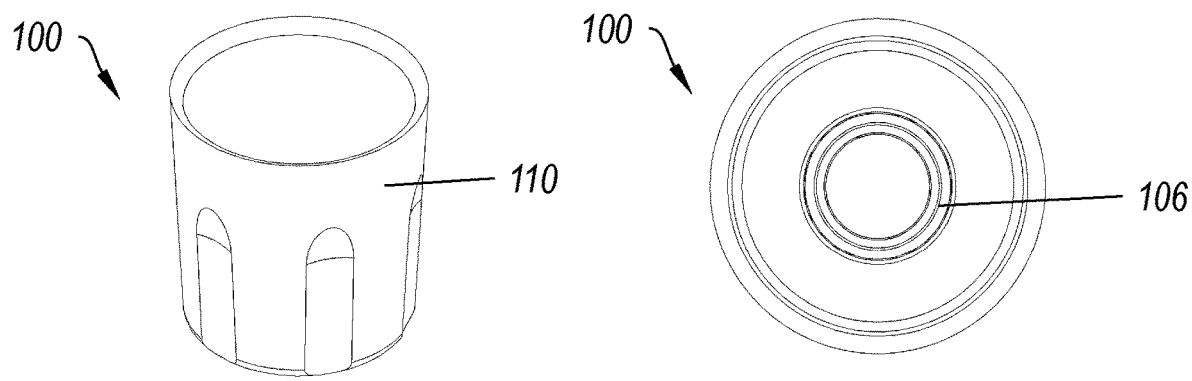
FIG. 1I illustrates a top isometric view of the example of a tumbler from a transportable flask with attached tumblers.
FIG. 1J illustrates a top view of the example of a bottle from a transportable flask with attached tumblers.
Figure 1K:
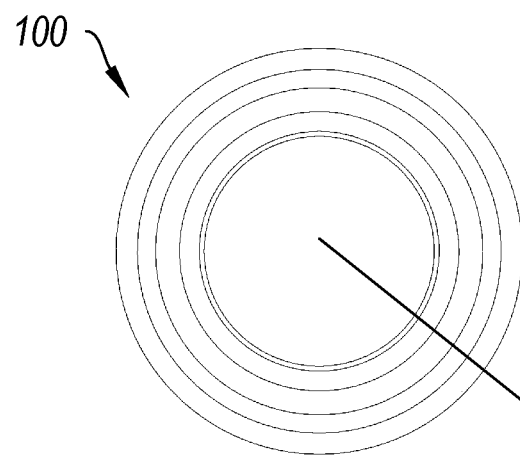
FIG. 1K illustrates a bottom view of the example of a bottle from a transportable flask with attached tumblers.
Figure 1L:
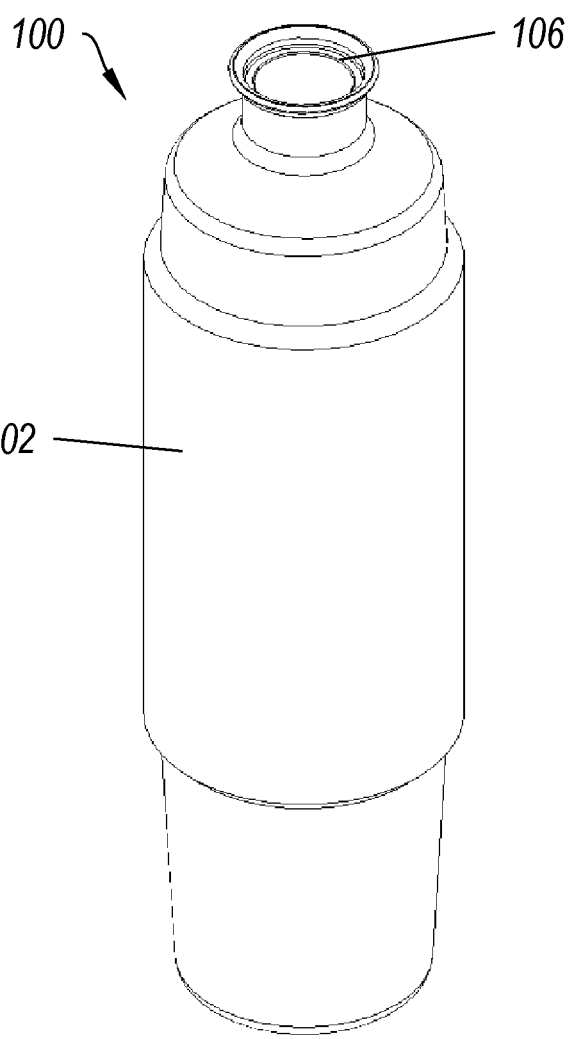
FIG. 1L illustrates a top isometric view of the example of a bottle from a transportable flask with attached tumblers.
Figures 1M, 1N:
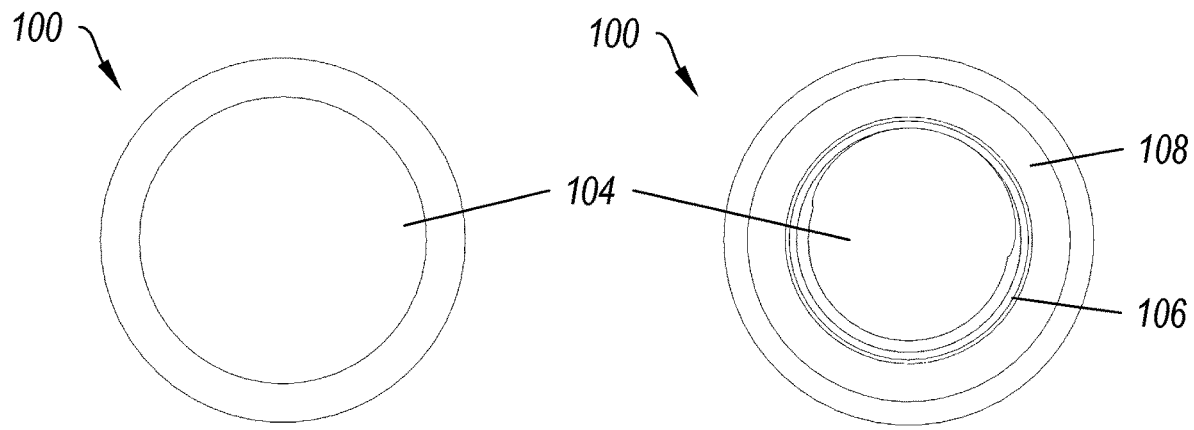
FIG. 1M illustrates a top view of the example of a cap from a transportable flask with attached tumblers.
FIG. 1N illustrates a bottom view of the example of a cap from a transportable flask with attached tumblers.
Figure 1O:
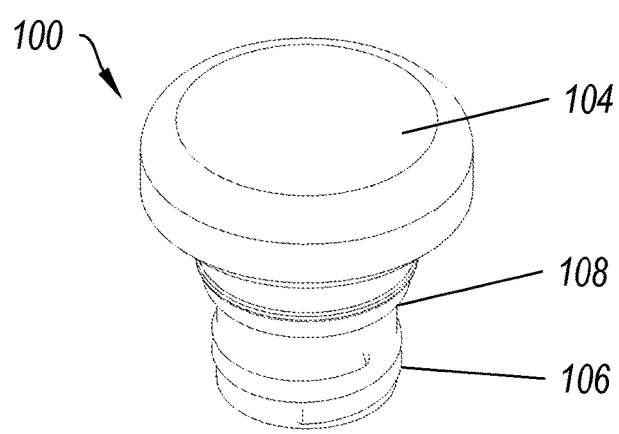
FIG. 1O illustrates a top isometric view of the example of a cap from a transportable flask with attached tumblers.

FIGS. 1A-1O (collectively "FIG. 1") illustrate an example of a transportable flask with attached tumblers 100. FIG. 1A illustrates a side view of the example of a transportable flask with attached tumblers 100; FIG. 1B illustrates a top view of the example of a transportable flask with attached tumblers 100, with the bottom view being a mirror image thereof; FIG. 1C illustrates an isometric view of the example of a transportable flask with attached tumblers 100; FIG. 1D illustrates an expanded side view of the example of a transportable flask with attached tumblers 100; FIG. 1E illustrates an expanded top isometric view of the example of a transportable flask with attached tumblers 100; FIG. 1F illustrates an expanded bottom isometric view of the example of a transportable flask with attached tumblers 100; FIG. 1G illustrates a top view of the example of a tumbler from a transportable flask with attached tumblers 100; FIG. 1H illustrates a bottom view of the example of a tumbler from a transportable flask with attached tumblers 100; FIG. 1I illustrates a top isometric view of the example of a tumbler from a transportable flask with attached tumblers 100; FIG. 1J illustrates a top view of the example of a bottle from a transportable flask with attached tumblers 100; FIG. 1K illustrates a bottom view of the example of a bottle from a transportable flask with attached tumblers 100; FIG. 1L illustrates a top isometric view of the example of a bottle from a transportable flask with attached tumblers 100; FIG. 1M illustrates a top view of the example of a cap from a transportable flask with attached tumblers 100; FIG. 1N illustrates a bottom view of the example of a cap from a transportable flask with attached tumblers 100; and FIG. 1O illustrates a top isometric view of the example of a cap from a transportable flask with attached tumblers 100. The transportable flask with attached tumblers 100 includes everything that a user needs to transport and share a liquid beverage, whether cooled or heated. That is, the transportable flask with attached tumblers 100 can be used to transport a liquid beverage, even if the liquid beverage is not ambient temperature, and share the liquid beverage amongst two people without forcing them to share a cup.

FIG. 1 shows that the transportable flask with attached tumblers 100 can include a bottle 102. The bottle 102 is both thermally insulated and configured to hold a liquid beverage (e.g., the bottle 102 is waterproof). Thermal insulation is the reduction of heat transfer (i.e. the transfer of thermal energy between objects of differing temperature) between objects in thermal contact or in range of radiative influence. Thermal insulation can be achieved with specially engineered methods or processes, as well as with suitable object shapes and materials. Heat flow is an inevitable consequence of contact between objects of different temperature. Thermal insulation provides a region of insulation in which thermal conduction is reduced or thermal radiation is reflected rather than absorbed by the lower-temperature body. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 1 also shows that the transportable flask with attached tumblers 100 can include a cap 104. The cap 104 is configured to attach to the bottle 102. The cap 104 is a protective lid or cover which seals the interior of the bottle 102. I.e., the cap 104 allows a user to access the liquid beverage in the bottle 102. The cap 104 needs to completely seal the bottle 102 such that the liquid beverage remains within the bottle 102 when the cap 104 is in place.

FIG. 1 further shows that the transportable flask with attached tumblers 100 can include threading 106. For example, the cap 104 can include male threading 106 which mates with female threading 106 in the neck of the bottle 102. A threading 106, sometimes called a screw thread, is a helical structure used to convert between rotational and linear movement or force. I.e., a thread 106 is a ridge wrapped around a cylinder or cone in the form of a helix, with the former being called a straight thread and the latter called a tapered thread. Thus, the thread 106 converts rotation of the cap 104 to linear motion of the cap 104 to linear motion of the cap 104 relative to the bottle 102.

The mechanical advantage of a thread 106 depends on its lead, which is the linear distance the screw travels in one revolution. In most applications, the lead of a thread 106 is chosen so that friction is sufficient to prevent linear motion being converted to rotary, that is so the cap 104 does not slip even when linear force is applied, as long as no external rotational force is present. Thread lead and thread pitch are closely related concepts. The difference between them can cause confusion, because they are equivalent for some screws. Lead is the distance along the screw's axis that is covered by one complete rotation of the screw (360°). Pitch is the distance from the crest of one thread to the next. Because the vast majority of screw threadforms are single-start threadforms, their lead and pitch are the same. Single-start means that there is only one "ridge" wrapped around the cylinder of the screw's body. Each time that the screw's body rotates one turn (360°), it has advanced axially by the width of one ridge. "Double-start" means that there are two "ridges" wrapped around the cylinder of the screw's body. Each time that the screw's body rotates one turn (360°), it has advanced axially by the width of two ridges. Another way to say the same idea is that lead and pitch are parametrically related, and the parameter that relates them, the number of starts, often has a value of 1, in which case their relationship becomes equivalence. Single start threads will be assumed herein unless otherwise specified.

Specifying the lead of a thread form can include metric based or inch-based standards. For example, inch-based standards usually use threads per inch (TPI), which is how many threads occur per inch of axial screw length. Lead and TPI describe the same underlying physical property—merely in different terms. When units of measurement are constant TPI is the reciprocal of lead and vice versa. For example, a V4-20 thread has 20 TPI, which means that its lead is ½0 inch (0.050"). Metric based standards can measure the threads per millimeter or threads per centimeter.

FIG. 1 additionally shows that the transportable flask with attached tumblers 100 can include a seal 108. The seal 108 prevents leaks between the cap 104 and the bottle 102. For example, the seal 108 can include a silicone gasket that is placed around a portion of the cap 104. I.e., the seal 108 stays in place around the cap 104 such that when a user places the cap 104 on the bottle 102 the seal prevents any leakage between the bottle 102 and the cap 104. In particular, rotation of the cap 104 relative to the bottle 102 can exert force on the seal 108 via the threads 106 which compresses the seal 108.

FIG. 1 moreover shows that the transportable flask with attached tumblers 100 can include a pair of cups 110. The pair of cups 110 are identical to one another and are secured to portions of the bottle 102 and/or the cap 104, as described below. The cups 110 are small, bowl-shaped containers for drinking. I.e., the cups 110 receive the liquid beverage from the bottle 102, allowing a user to drink the liquid beverage.

Figure 2A:
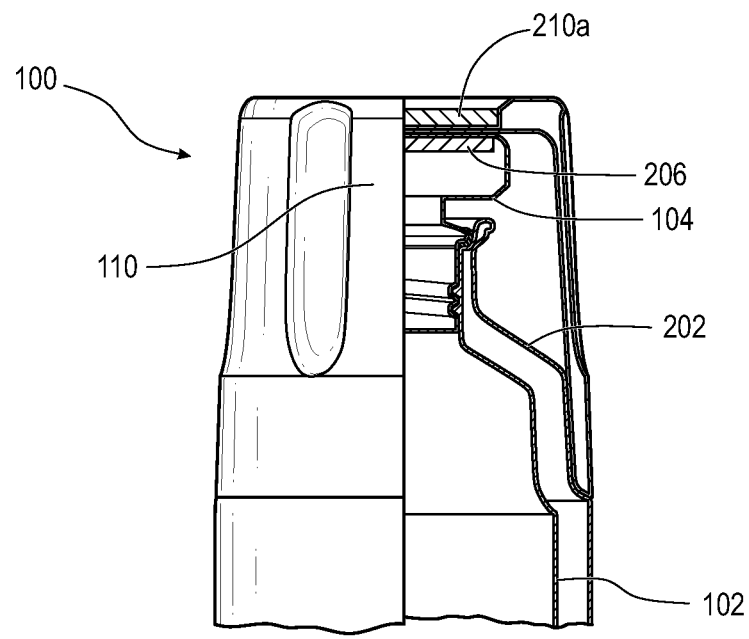
FIG. 2A illustrates a side cutaway view of the top of the transportable flask with attached tumblers.
Figure 2B:
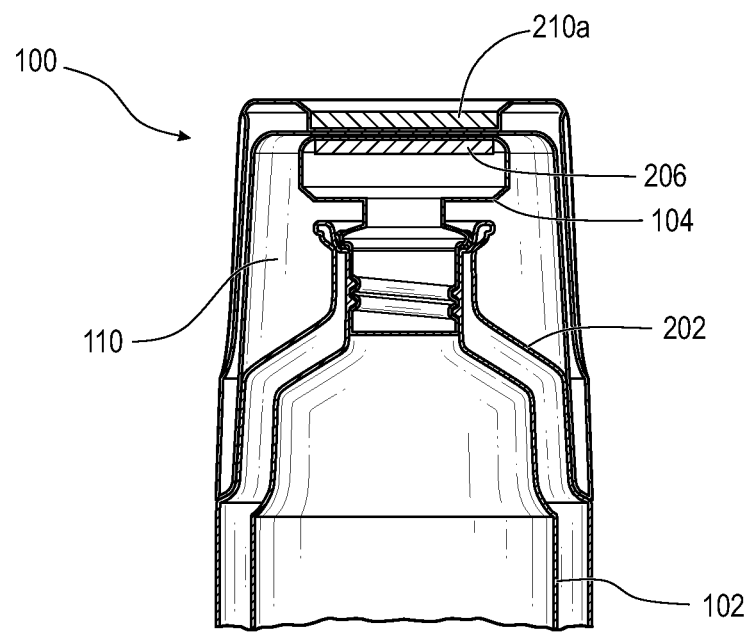
FIG. 2B illustrates a side cutaway view of the top of the transportable flask with attached tumblers including surface shading.
Figure 2C:
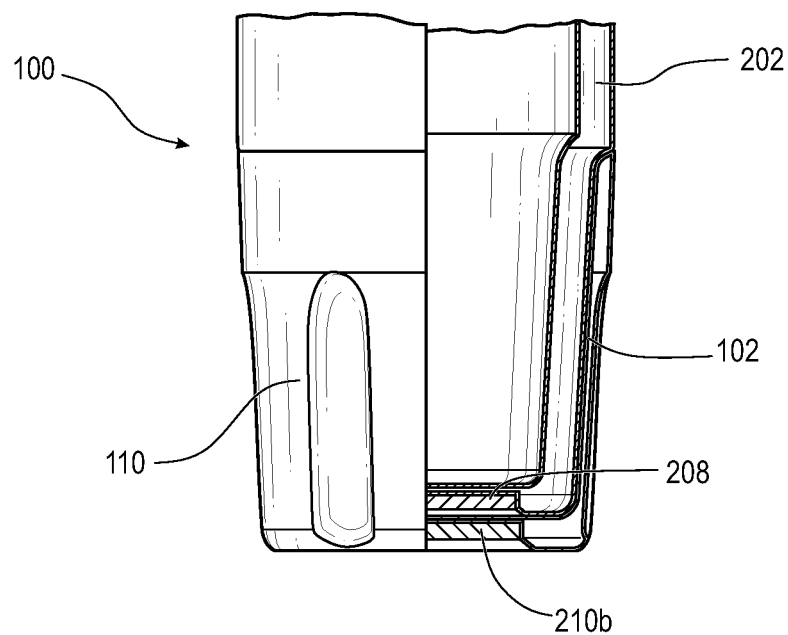
FIG. 2C illustrates a side cutaway view of the bottom of the transportable flask with attached tumblers.
Figure 2D:
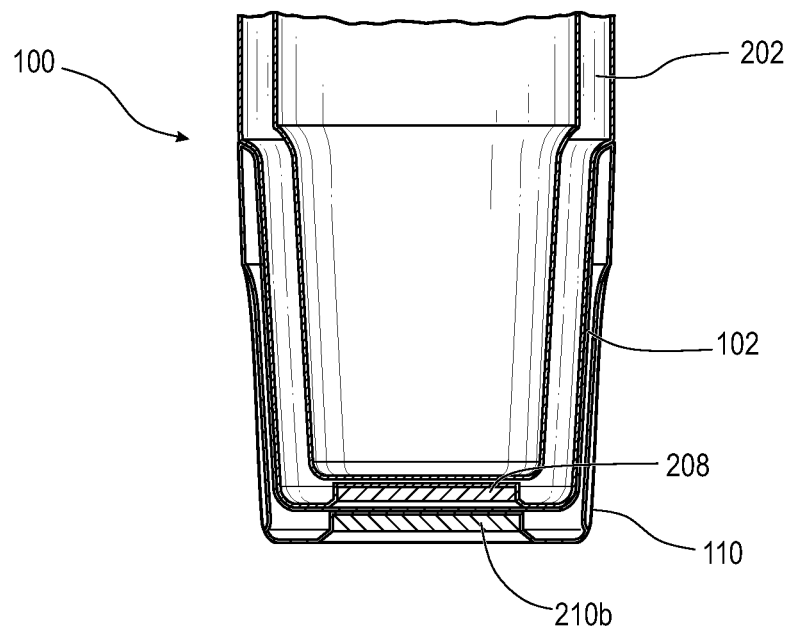
FIG. 2D illustrates a side cutaway view of the bottom of the transportable flask with attached tumblers including surface shading.

FIGS. 2A-2D (collectively "FIG. 2") illustrate a cutaway view of the example of a transportable flask with attached tumblers 100. FIG. 2A illustrates a side cutaway view of the top of the transportable flask with attached tumblers 100; FIG. 2B illustrates a side cutaway view of the top of the transportable flask with attached tumblers 100 including surface shading; FIG. 2C illustrates a side cutaway view of the bottom of the transportable flask with attached tumblers 100; and FIG. 2D illustrates a side cutaway view of the bottom of the transportable flask with attached tumblers 100 including surface shading. The transportable flask is meant to be capable of serving a liquid with all pieces attached. I.e., the transportable flask with attached tumblers 100 holds a liquid for transportation, such as hiking, and then allows the beverage to be enjoyed and shared upon reaching the user's destination.

FIG. 2 shows that the bottle 102 (and/or the pair of cups 110) can include a double wall 202. The double wall 202 acts to insulate the bottle 102. That is, the double wall 202 includes a low thermal conductivity material which slows heat transfer between the bottle 102 and the outside environment. For example, the double wall 202 can include a vacuum or other desired material. The benefit of a vacuum is that a puncture in one or both of the walls in the double wall 202 does not result in a substance leaking into the liquid beverage. I.e., there are no possible ill health effects of a puncture of one of the walls in the double wall 202.

FIG. 2 also shows that the bottle 102 (and/or the pair cups 110) can include an inner coating 204. The inner coating 204 prevents any change in the liquid beverage flavor. For example, the inner coating 204 can include electropolished stainless steel. Electropolishing, also known as electrochemical polishing, anodic polishing or electrolytic polishing (especially in the metallography field), is an electrochemical process that removes material from a metallic workpiece. It is used to polish, passivate, and deburr metal parts. It is often described as the reverse of electroplating. It may be used in lieu of abrasive fine polishing in microstructural preparation. Typically, the work-piece is immersed in a temperature-controlled bath of electrolyte and serves as the anode; it is connected to the positive terminal of a DC power supply, the negative terminal being attached to the cathode. An electrical current passes from the anode, where metal on the surface is oxidized and dissolved in the electrolyte, to the cathode. At the cathode, a reduction reaction occurs, which normally produces hydrogen. Electrolytes used for electropolishing are most often concentrated acid solutions having a high viscosity, such as mixtures of sulphuric acid and phosphoric acid. Other electropolishing electrolytes reported in the literature include mixtures of perchlorates with acetic anhydride and methanolic solutions of sulphuric acid. One of the benefits of electropolishing for stainless steel is that it removes iron from the surface and enhances the chromium/nickel content for the most superior form of passivation for stainless steel. Electropolishing also provides a clean and smooth surface that is easier to sterilize, while improving the surface finish by levelling micro-peaks and valleys.

FIG. 2 further shows that the cap can include a first magnet 206 in the cap 104. A magnet is a material or object that produces a magnetic field. This magnetic field is invisible but is responsible for the most notable property of a magnet: a force that pulls on other ferromagnetic materials, such as iron, and attracts or repels other magnets. A permanent magnet is an object made from a material that is magnetized and creates its own persistent magnetic field. An everyday example is a refrigerator magnet used to hold notes on a refrigerator door. As used herein, magnets are paired with one another. The pair of magnets can include either two permanent magnets or a permanent magnet and a ferromagnetic material.

Materials that can be magnetized, which are also the ones that are strongly attracted to a magnet, are called ferromagnetic (or ferrimagnetic). These include iron, nickel, cobalt, some alloys of rare-earth metals, and some naturally occurring minerals such as lodestone. Although ferromagnetic (and ferrimagnetic) materials are the only ones attracted to a magnet strongly enough to be commonly considered magnetic, all other substances respond weakly to a magnetic field, by one of several other types of magnetism.

Ferromagnetic materials can be divided into magnetically "soft" materials like annealed iron, which can be magnetized but do not tend to stay magnetized, and magnetically "hard" materials, which do. Permanent magnets are made from "hard" ferromagnetic materials such as alnico and ferrite that are subjected to special processing in a strong magnetic field during manufacture to align their internal microcrystalline structure, making them very hard to demagnetize. To demagnetize a saturated magnet, a certain magnetic field must be applied, and this threshold depends on coercivity of the respective material. "Hard" materials have high coercivity, whereas "soft" materials have low coercivity. The overall strength of a magnet is measured by its magnetic moment or, alternatively, the total magnetic flux it produces. The local strength of magnetism in a material is measured by its magnetization.

FIG. 2 additionally shows that the transportable flask with attached tumblers 100 can include a second magnet 208 in the bottom of the bottle 102. I.e., the bottom of the bottle 102 has a magnet (or ferromagnetic material) within the double wall 202 of the bottle 102. Whatever is used in the cap 104 will generally be used in the double wall 202 of the bottle 102 and vice versa. That is, if the first magnet 206 is a permanent magnet then the second magnet will likewise be a permanent magnet and if the first magnet 206 is ferromagnetic material then the second magnet 208 will be ferromagnetic material. In addition, the polarity of the first magnet 206 will be opposite the second magnet 208. E.g., if the polarity of the first magnet 206 is such that the positive pole is directed upward when the cap 104 is secured to the bottle 102 then the polarity of the second magnet 208 will be such that the positive pole is directed downward. I.e., the orientation of the first magnet 206 and the second magnet 208 are both such that the positive pole is the same relative to the center of the bottle 102 (e.g., both positive poles point toward or away from the center of the bottle 102).

FIG. 2 moreover shows that the transportable flask with attached tumblers 100 can include a third magnet 210a and a fourth magnet 210b (collectively "cup magnets 210"). The cup magnets 210 secure the pair of cups 110 to the bottle 102 and the cap 104 for transporting. In particular, the polarity of the cup magnets 210 are aligned to be opposite the polarity of the first magnet 206 and second magnet 208 (e.g., if the positive pole of the first magnet 206 and the second magnet 208 both point away from the center of the bottle 102 then the negative pole of the cup magnets points to the center of the bottle 102 when the cups are in place). Therefore, when one of the cups 110 is placed near the bottom of the bottle 102 (i.e., in proximity to the first magnet 206) there is a magnetic attraction which holds the cup 110 in place. Likewise, when one of the cups 110 is placed near cap 104 (i.e., in proximity to the second magnet 208) there is a magnetic attraction which holds the cup 110 in place.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transportable flask, the transportable flask comprising:
   a bottle configured to hold a liquid beverage comprising:
      a neck;
      a first wall forming outer sides and an outer bottom portion of the bottle, the bottom portion being opposite the neck and configured for resting upon a surface and supporting the bottle in an upright position;
      a second wall forming inner sides and an inner bottom portion, the second wall spaced from the first wall to define a first space therein between, the first space between the first wall and the second wall providing an insulative layer between the first and second walls to help maintain a temperature of the liquid beverage contained within the bottle, the first and second walls extending from proximate the neck and forming the outer and inner bottom portions, respectively;
   a cap, configured to be attachable to the neck of bottle and to prevent removal of the liquid beverage when attached to the neck;
   a first magnet, positioned within a top portion of the cap;
   a first cup having a rim, a bottom, an outer wall and an inner wall spaced from the outer wall to define a second space therein between, the inner wall sized to fit over the cap and an upper portion of the bottle so that a bottom portion of the inner wall is positioned adjacent the top of the cap; and
   a first ferromagnetic material positioned in the second space and adjacent the bottom portion of the inner wall, wherein the first magnet of the cap when attached to the bottle magnetically holds the first ferromagnetic material of the first cup to the to the cap and thus the first cup to the bottle when the cap is attached to the bottle and the first cup is placed over the cap and the upper portion of the bottle, the first cup being removable therefrom by overcoming magnetic force between the first magnet and the first ferromagnetic material.

2. The transportable flask of claim 1, further comprising:
   a second magnet positioned within the first space of the bottle adjacent the outer bottom portion;
   a second cup having a rim, a bottom, an outer wall and an inner wall spaced from the outer wall defining a third space therein between, the inner wall sized to fit over the outer bottom portion of the bottle so that an inner bottom surface of the inner wall of the second cup is positioned adjacent the outer bottom portion of the bottle; and
   a second ferromagnetic material positioned in the third space adjacent the bottom portion of the inner wall, wherein the second magnet of the bottle magnetically holds the second ferromagnetic material of the second cup and thus the second cup to the outer bottom portion of the bottle when the second cup is placed over the outer bottom portion of the bottle, the second cup being removable therefrom by overcoming magnetic force between the second magnet and the second ferromagnetic material.

3. The transportable flask of claim 1, further comprising a thermal insulator within the space between the inner wall and the outer wall of the bottle.

4. The transportable flask of claim 1, wherein the space between the inner wall and the outer wall of the bottle a vacuum.

5. The transportable flask of claim 1, wherein inner surfaces of the inner wall of the bottle are electropolished.

6. The transportable flask of claim 1, wherein inner surfaces of the inner wall of the first cup are electropolished.

7. The transportable flask of claim 2, wherein inner surfaces of the inner wall of the second cup are electropolished.

8. The transportable flask of claim 2, wherein the first cup and the second cup are identically configured and interchangeable with one another so that the first cup is attachable to the bottom of the bottle and the second cup is attachable to the top of the bottle.

9. The transportable flask of claim 1, wherein the first magnet comprises a permanent magnet.

10. The transportable flask of claim 2, wherein the second magnet comprises a permanent magnet.

11. The transportable flask of claim 1, wherein the bottle includes a first stepped transition between the upper portion of the bottle and a lower portion of the bottle, with the upper portion of the bottle adjacent the first stepped transition having an outer diameter that is slightly smaller than an inner diameter of the first cup at the rim and the lower portion of the bottle adjacent the first stepped transition having an outer diameter that is substantially the same as an outer diameter of the first cup at the rim.

12. The transportable flask of claim 2, wherein the bottle includes a second stepped transition between the first stepped transition and the outer bottom portion, with the lower bottom portion of the bottle adjacent the second stepped transition having an outer diameter that is slightly smaller than an inner diameter of the second cup at the rim and an outer diameter of the bottle above the second stepped transition having a diameter that is substantially the same as an outer diameter of the second cup at the rim.

13. The transportable flask of claim 1, wherein the neck of the bottle includes a first set of threads and the cap includes a second set of threads for mating with the first set of threads for securing the cap to the neck of the bottle.

14. The transportable flask of claim 1, further comprising a seal attached to the cap and interposed between the cap and the neck of the bottle when attached thereto.

15. The transportable flask of claim 1, wherein the first ferromagnetic material comprises at least one of iron or nickel.

16. The transportable flask of claim 2, wherein the second ferromagnetic material comprises at least one of iron or nickel.

17. A transportable flask, the transportable flask comprising:
  a bottle configured to hold a liquid beverage comprising:
    a neck;
    a first wall forming outer sides and an outer bottom portion of the bottle, the bottom being opposite the neck and configured for resting upon a surface and supporting the bottle in an upright position;
    a second wall forming inner sides and an inner bottom portion, the second wall spaced from the first wall to define a first space therein between, the first space between the first wall and the second wall providing an insulative layer between the first and second walls to help maintain a temperature of the liquid beverage contained within the bottle, the first and second walls extending from proximate the neck and forming the outer and inner bottom portions, respectively;
  a cap, configured to be attachable to the neck of bottle and to prevent removal of the liquid beverage when attached to the neck;
  a first ferromagnetic material, coupled to a top portion of the cap;
  a first cup having a rim, a bottom, and defining inner and outer wall surfaces, the inner wall surface sized to fit over the cap and an upper portion of the bottle so that a bottom portion of the inner wall surface is positioned adjacent the top of the cap; and
  a second ferromagnetic material coupled to the bottom of the cup, wherein the first ferromagnetic material of the cap when attached to the bottle magnetically holds the second ferromagnetic material of the first cup to the to the cap and thus the first cup to the bottle when the cap is attached to the bottle and the first cup is placed over the cap and the upper portion of the bottle, the first cup being removable therefrom by overcoming magnetic force between the first ferromagnetic material and the second ferromagnetic material.

18. The transportable flask of claim 17, further comprising:
  a third ferromagnetic material positioned within the first space of the bottle adjacent the outer bottom portion;
  a second cup having a rim, a bottom, an outer and inner wall surface, the inner wall surface sized to fit over the outer bottom portion of the bottle so that an inner bottom surface of the second cup is positioned adjacent the outer bottom portion of the bottle; and
  a fourth ferromagnetic material coupled to the bottom of the second cup, wherein the third ferromagnetic material of the bottle magnetically holds the fourth ferromagnetic material of the second cup and thus the second cup to the outer bottom portion of the bottle when the second cup is placed over the outer bottom portion of the bottle, the second cup being removable therefrom by overcoming magnetic force between the third ferromagnetic material and the fourth ferromagnetic material.

19. The transportable flask of claim 18, wherein the first cup and the second cup are identically configured and interchangeable with one another so that the first cup is attachable to the bottom of the bottle and the second cup is attachable to the top of the bottle.

20. The transportable flask of claim 17, wherein the first ferromagnetic material comprises a permanent magnet.

21. The transportable flask of claim 18, wherein the third ferromagnetic material comprises a permanent magnet.

22. The transportable flask of claim 17, wherein the second ferromagnetic material comprises at least one of iron or nickel.

23. The transportable flask of claim 18, wherein the fourth ferromagnetic material comprises at least one of iron or nickel.

24. The transportable flask of claim 17, wherein the bottle includes a first stepped transition between the upper portion of the bottle and a lower portion of the bottle, with the upper portion of the bottle adjacent the first stepped transition having an outer diameter that is slightly smaller than an inner diameter of the first cup at the rim and the lower portion of the bottle adjacent the first stepped transition having an outer diameter that is substantially the same as an outer diameter of the first cup at the rim.

25. The transportable flask of claim 18, wherein the bottle includes a second stepped transition between the first stepped transition and the outer bottom portion, with the lower bottom portion of the bottle adjacent the second stepped transition having an outer diameter that is slightly smaller than an inner diameter of the second cup at the rim and an outer diameter of the bottle above the second stepped transition having a diameter that is substantially the same as an outer diameter of the second cup at the rim.

26. The transportable flask of claim 17, wherein the neck of the bottle includes a first set of threads and the cap includes a second set of threads for mating with the first set of threads for securing the cap to the neck of the bottle.

27. A transportable flask, the transportable flask comprising:
  a bottle configured to hold a liquid beverage comprising:
    an outer wall forming an upper portion defining a neck, a lower portion defining a bottom opposite the neck and configured for resting upon a surface and supporting the bottle in an upright position, a mid-portion extending between the upper portion and the lower portion the bottle, and a first stepped transition between the upper portion and the mid-portion, wherein the mid-portion has an outer diameter adjacent the first stepped transition that is greater than an outer diameter of the upper portion adjacent the first stepped transition;
a cap configured to be attachable to the neck of bottle and to prevent removal of the liquid beverage when attached to the neck;
a first ferromagnetic material attached to the cap;
a first cup having a rim and a bottom, the cup configured to fit over the cap and the cup having an inner diameter at the rim that is slightly larger than the outer diameter of the upper portion of the bottle proximate the stepped transition and having an outer diameter proximate the rim that is approximately equal to the outer diameter of the mid-portion of the bottle proximate the stepped transition;
a second ferromagnetic material attached to the cup, wherein the first ferromagnetic material of the cap when attached to the bottle magnetically holds the second ferromagnetic material of the first cup to the cap and thus the first cup to the bottle when the cap is attached to the bottle and the first cup is placed over the cap and the upper portion of the bottle, the first cup being removable therefrom by overcoming magnetic force between the first ferromagnetic material and the second ferromagnetic material.

28. The transportable flask of claim 27, wherein the first cup further comprises an inner wall spaced from an outer wall to define a space therein between, the second ferromagnetic material positioned within the space at the bottom of the cup so as to be positioned proximate the cap when placed over the upper portion of the bottle.

29. The transportable flask of claim 27, further comprising a second stepped transition between the mid-portion and the lower portion of the bottle, wherein the mid-portion has an outer diameter adjacent the second stepped transition that is greater than an outer diameter of the lower portion adjacent the second stepped transition and further comprising a third ferromagnetic material attached to the bottom of the bottle.

30. The transportable flask of claim 29, further comprising a second cup having a rim and a bottom, the second cup configured to fit over the lower portion of the bottle and the second cup having an inner diameter at the rim that is slightly larger than the outer diameter of the lower portion of the bottle proximate the second stepped transition and having an outer diameter proximate the rim that is approximately equal to the outer diameter of the mid-portion of the bottle proximate the second stepped transition and further comprising a fourth ferromagnetic material attached to the bottom of the second cup.

31. The transportable flask of claim 30, wherein the bottle further comprises an inner wall spaced from the outer wall to define a space therein between and the third ferromagnetic material is positioned within the space at the bottom of the bottle and proximate the fourth ferromagnetic material of the second cup to magnetically retain the second cup to the lower portion of the bottle.

32. The transportable flask of claim 30, wherein the first cup and the second cup are identically configured and interchangeable with one another so that the first cup is attachable to the lower portion of the bottle and the second cup is attachable to the upper portion of the bottle.

33. The transportable flask of claim 27, wherein the first ferromagnetic material comprises a permanent magnet.

34. The transportable flask of claim 29, wherein the third ferromagnetic material comprises a permanent magnet.

35. The transportable flask of claim 27, wherein the second ferromagnetic material comprises at least one of iron or nickel.

36. The transportable flask of claim 30, wherein the fourth ferromagnetic material comprises at least one of iron or nickel.

\* \* \* \* \*